United States Patent
Dang

(10) Patent No.: US 8,416,095 B2
(45) Date of Patent: Apr. 9, 2013

(54) TELEVISION VIEWING SAFETY SYSTEM AND METHOD

(75) Inventor: De-Hua Dang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 423 days.

(21) Appl. No.: 12/765,884

(22) Filed: Apr. 23, 2010

(65) Prior Publication Data
US 2010/0309010 A1      Dec. 9, 2010

(30) Foreign Application Priority Data
Jun. 5, 2009  (CN) .......................... 2009 1 0302940

(51) Int. Cl.
*G08B 21/00* (2006.01)

(52) U.S. Cl. .................. 340/686.6; 340/573.1; 340/567; 348/819; 348/818

(58) Field of Classification Search ............... 340/686.6, 340/567, 573.1; 348/819, 818, 820, 155, 348/164
See application file for complete search history.

(56) References Cited

U.S. PATENT DOCUMENTS
4,835,614 A * 5/1989 Ryu ................................. 725/25
5,408,276 A * 4/1995 Morales ........................ 348/818
5,495,302 A * 2/1996 Abruna ......................... 348/819

FOREIGN PATENT DOCUMENTS
CN           2610422 Y           4/2004

* cited by examiner

*Primary Examiner* — Hai Phan
*Assistant Examiner* — Hongmin Fan
(74) *Attorney, Agent, or Firm* — Altis Law Group, Inc.

(57) ABSTRACT

In a television viewing safety system and method, a detection zone of a sensor is set. The sensor is turned on to detect whether a person moves into the detection zone. If the person is detected moving into the detection zone, the television is controlled to display under a safe display mode. If the person is not detected moving into the detection zone, the television is controlled to display under a normal display mode.

18 Claims, 3 Drawing Sheets

TELEVISION VIEWING SAFETY SYSTEM AND METHOD

BACKGROUND

1. Technical Field

Embodiments of the present disclosure relate to safety systems and methods, and particularly to a television viewing safety system and method.

2. Description of Related Art

A television is one of the most popular electronic devices in homes. However, electromagnetic radiation generated by televisions may harm people's health, and light from display screens may damage people's eyes if people view televisions too close.

DETAILED DESCRIPTION

In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

Figure 1:
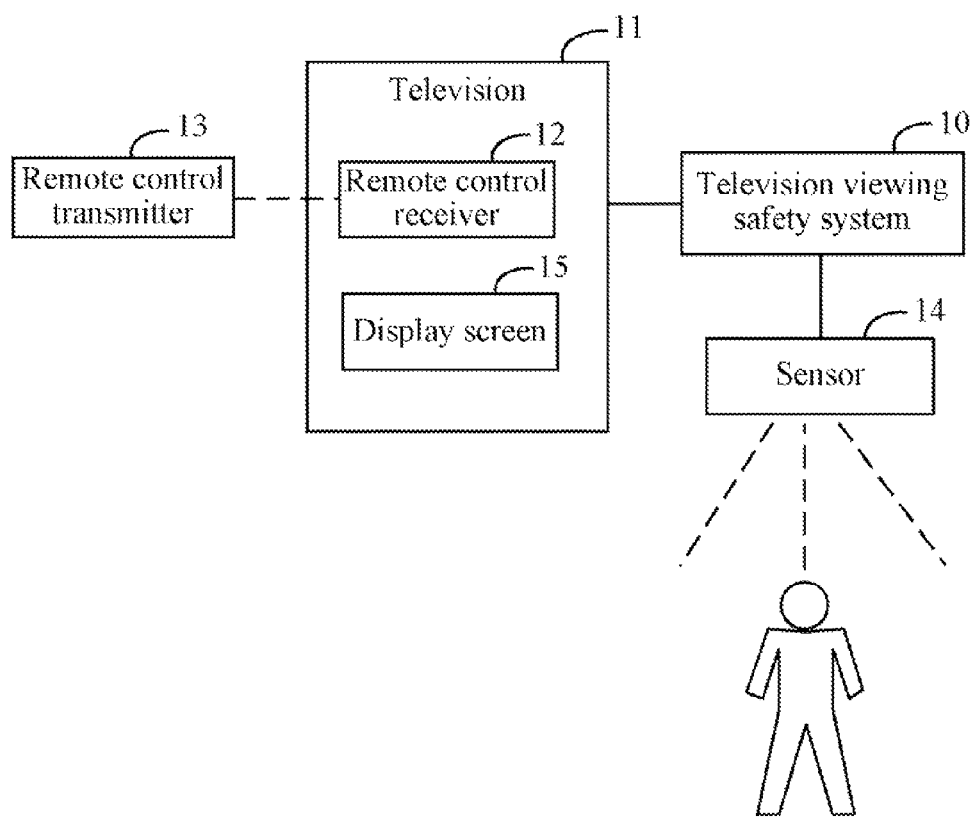
FIG. 1 is a block diagram of one embodiment of an application environment of a television viewing safety system.

FIG. 1 is a block diagram of one embodiment of an application environment of a television viewing safety system 10. The television viewing safety system 10 may be used to prevent users from viewing a television 11 too close. The television viewing safety system 10 controls a sensor 14 to detect the proximity of a person to the television 11, and controls the television 11 to display under different display modes accordingly. The television viewing safety system 10 and the sensor 14 may be included in the television or in peripheral devices in proximity to the television 11. In one embodiment, the television 11 includes a remote control receiver 12 and a display screen 15. The control receiver 12 receives control signals, such as a detection signal from a remote control transmitter 13. The remote control transmitter 13 and the remote control receiver 12 may transfer the control signals by infrared. The sensor 14 can be an infrared sensor, a facial recognition sensor, or a microwave sensor, for example.

Figure 2:
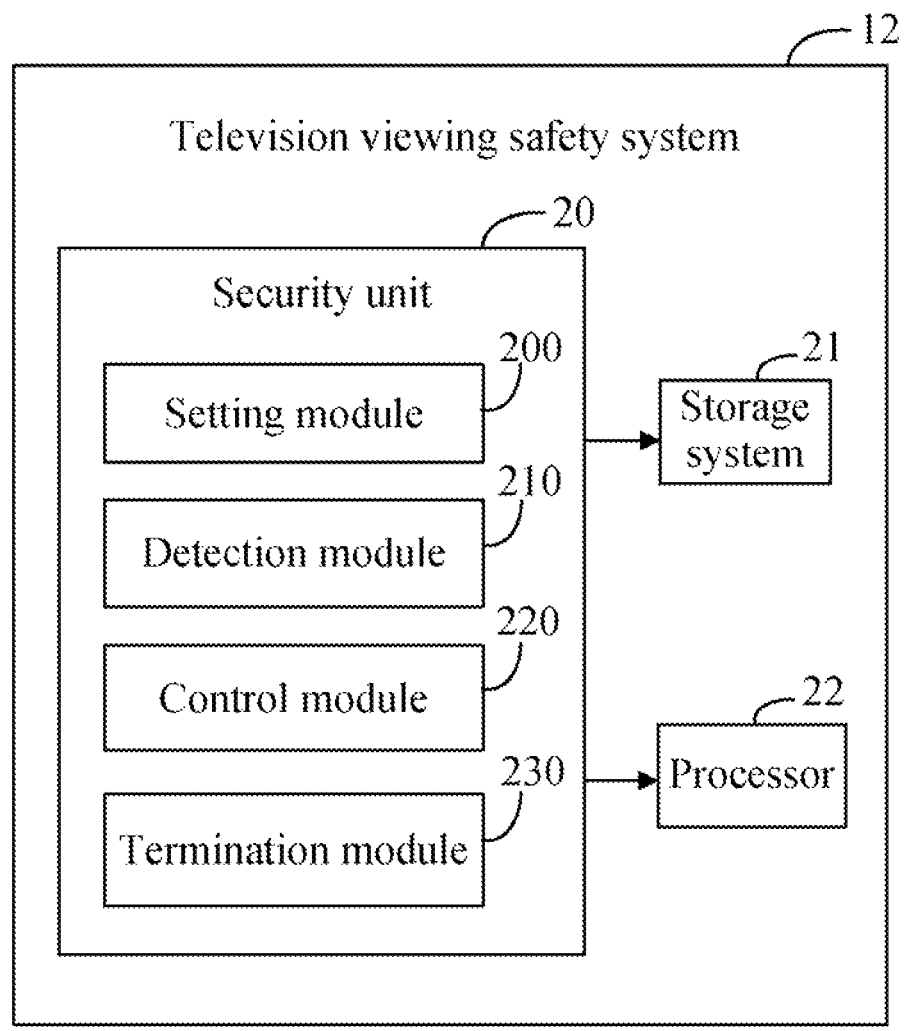
FIG. 2 is a block diagram of one embodiment of a television viewing safety system of FIG. 1.

FIG. 2 is a block diagram of one embodiment of the television viewing safety system 10 of FIG. 1. In one embodiment, the television viewing safety system 10 includes a security unit 20, a storage system 21, and at least one processor 22. One or more computerized codes of the security unit 20 may be stored in the storage system 21 and executed by the at least one processor 22.

The security unit 20 may include a setting module 200, a detection module 210, a control module 220, and a termination module 230. Details of the modules 200-230 will be explained below.

The setting module 200 sets a detection zone of the sensor 14, such as 3 meters. The detection zone is a safe distance that a person should be standing away from the television 11. In one embodiment, the setting module 200 sets the detection zone according to an electromagnetic radiation intensity of the television 11. The electromagnetic radiation intensity may be determined according to a size and a type of the television 11.

The detection module 210 turns on the sensor 14, such that the sensor 14 detects if the person moves into the detection zone. In one embodiment, the detection module 210 turns on the sensor 14 when the remote control receiver 12 receives a detection signal from the remote control transmitter 13.

The control module 220 controls the television 11 to enter different display modes in response to detection results from the sensor 14. In one embodiment, the control module 220 may control the television 11 to enter a safe display mode if the sensor 14 detects the person moving into the detection zone. In the safe display mode, the television 11 may output an alarm picture or a black picture on the display screen 15. Otherwise, the control module 220 may control the television 11 to enter a normal display mode if the sensor 14 does not detect the person moving into the detection zone. The normal display mode is defined to include displaying various television programs.

The termination module 230 turns off the sensor 14, so that the operation of the sensor 14 is terminated. In one embodiment, the termination module 230 turns off the sensor 14 when the remote control receiver 12 receives a termination signal from the remote control transmitter 13.

Figure 3:
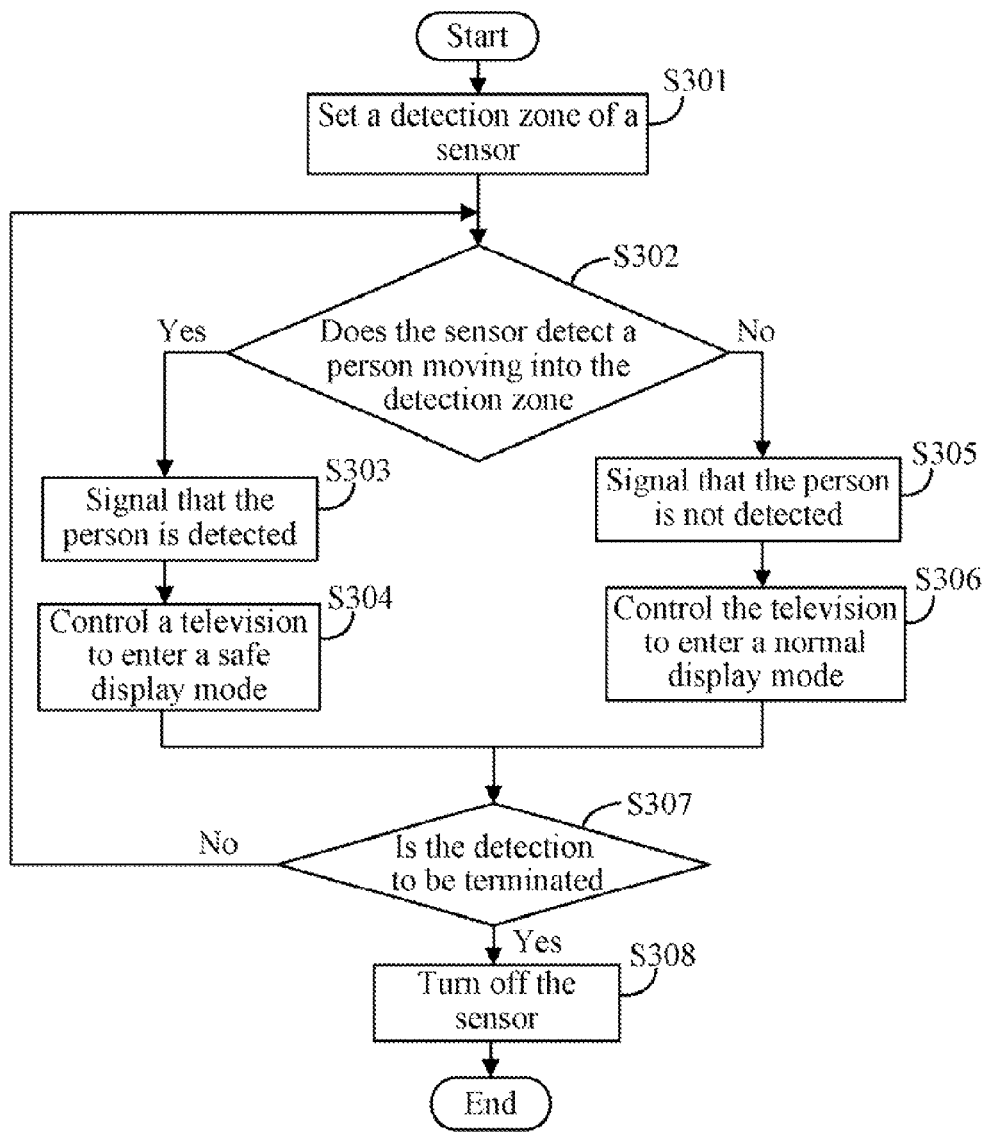
FIG. 3 illustrates one embodiment of a television viewing safety method implementing a system such as, for example, that of FIG. 1.

FIG. 3 is a flowchart of one embodiment of a television viewing safety method implementing such as, for example, the safety system 10 of FIG. 1. The television viewing safety method may be used to prevent users from viewing the television 11 too close. Depending on the embodiments, additional blocks may be added, others removed, and the order of the blocks may be changed.

In block S301, the setting module 200 sets a detection zone of the sensor 14. As mentioned above, the detection zone may be a safe distance a person should be standing away from the television 11. In one embodiment, the detection zone may be set according to an electromagnetic radiation intensity of the television 11. A large television may generate higher power electromagnetic radiation than a small television. Different types of televisions may emit electromagnetic radiation with different energy. For example, a cathode ray tube (CRT) television may generate higher power electromagnetic radiation than a plasma television, and a plasma television may generate higher power electromagnetic radiation than a liquid crystal display (LCD) television. In one example of a 42 inch LCD television, the detection zone can be set as 3 meters. Depending on the embodiment, the setting module 200 may set the detection zone according to a brightness of the display screen 15. For example, if the display screen 15 emits bright light, the detection zone may be set as 3 meters. If the display screen 15 emits dim light, the detection zone may be set as 2 meters.

In block S302, the detection module 210 turns on the sensor 14, such that the sensor 14 detects if the person moves into the detection zone. In one embodiment, the remote control transmitter 13 generates a detection signal and sends the detection signal to the remote control receiver 12. Upon receiving the detection signal, the remote control receiver 12 signals the detection module 210 to turn on the sensor 14.

If detecting the person moving into the detection zone, in block S303, the sensor 14 signals the control module 220 that the person is detected. In one embodiment, the sensor 14 sends a first detection signal, such as a 3.3 volt signal, to indicate that the person is detected within the detection zone.

Upon receiving the first detection signal from the sensor 14, in block S304, the control module 220 controls the television 11 to enter a safe display mode. In the safe display mode, the television 11 may display an alarm picture or a black picture on the display screen 15, to prevent the person from viewing the television 11 too close.

Otherwise, if the person is not detected moving into the detection zone, in block S305, the sensor 14 signals the control module 220 that the person is not detected. In one embodiment, the sensor 14 sends a second detection signal, such as a 0 volt signal, to indicate that the person is not detected within the detection zone. Upon receiving the second detection signal from the sensor 14, in block S306, the control module 220 controls the television 11 to enter a normal display mode.

In block S307, the termination module 230 determines whether to terminate the detection of the sensor 14. If the detection is not to be terminated, the process goes to block S302. Otherwise, if the detection is to be terminated, in block S308, the termination 230 turns off the sensor 14, so that the operation of the sensor 14 is terminated. In one embodiment, the remote control transmitter 13 generates a termination signal, and sends the termination signal to the remote control receiver 12. Upon receiving the termination signal, the remote control receiver 12 signals the termination module 230 to turn off the sensor 14.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A television viewing safety system, comprising:
    a storage system;
    at least one processor; and
    a security unit being stored in the storage system and executable by the at least one processor, the security unit comprising:
    a setting module operable to set a detection zone of a sensor, wherein the detection zone is a determined safe distance that a person should stand away from a television and is set according to a brightness of a display screen of the television, and wherein the sensor is positioned in the television or in proximity to the television;
    a detection module operable to turn on the sensor, such that the sensor detects if the person moves into the detection zone; and
    a control module operable to control the television to enter a safe display mode upon a condition that the sensor detects the person moving into the detection zone, wherein the television outputs an alarm picture on the display screen of the television in the safe display mode.

2. The television viewing safety system of claim 1, further comprising a termination module operable to turn off the sensor.

3. The television viewing safety system of claim 1, wherein the setting module sets the detection zone according to an electromagnetic radiation intensity of the television.

4. The television viewing safety system of claim 1, wherein the detection module turns on the sensor when a remote control receiver of the television receives a detection signal from a remote control transmitter.

5. The television viewing safety system of claim 1, wherein the control module is further operable to control the television to enter a normal display mode if the person is not detected moving into the detection zone.

6. The television viewing system of claim 1, wherein the sensor is an infrared senor, a facial recognition sensor, or a microwave sensor.

7. A television viewing safety method, comprising:
    setting a detection zone of a sensor, wherein the detection zone is a determined safe distance that a person should stand away from a television and is set according to a brightness of a display screen of the television, and wherein the sensor is positioned in the television or in proximity to the television;
    turning on the sensor, such that the sensor detects if the person moves into the detection zone; and
    controlling the television to enter a safe display mode upon a condition that the sensor detects the person moving into the detection zone, wherein the television outputs an alarm picture on the display screen of the television in the safe display mode.

8. The television viewing safety method of claim 7, further comprising:
    controlling the television to enter a normal display mode if the person is not detected moving into the detection zone.

9. The television viewing safety method of claim 7, further comprising turning off the sensor.

10. The television viewing safety method of claim 7, wherein the detection zone is set according to an electromagnetic radiation intensity of the television.

11. The television viewing safety method of claim 7, wherein the sensor is turned on when a remote control receiver of the television receives a detection signal from a remote control transmitter.

12. The television viewing safety method of claim 7, wherein the sensor is an infrared senor, a facial recognition sensor, or a microwave sensor.

13. A non-transitory computer-readable medium having stored thereon instructions that, when executed by a computerized device, cause the computerized device to execute a television viewing safety method, the method comprising:
    setting a detection zone of a sensor, wherein the detection zone is a determined safe distance that a person should stand away from a television and is set according to a brightness of a display screen of the television, and wherein the sensor is positioned in the television or in proximity to the television;
    turning on the sensor, such that the sensor detects if the person moves into the detection zone; and
    controlling the television to enter a safe display mode upon a condition that the sensor detects the person moving into the detection zone, wherein the television outputs an alarm picture on the display screen of the television in the safe display mode.

14. The non-transitory medium of claim 13, wherein the method further comprises:
    controlling the television to enter a normal display mode if the person is not detected moving into the detection zone.

15. The non-transitory medium of claim 13, wherein the method further comprises turning off the sensor.

16. The non-transitory medium of claim 13, wherein the detection zone is set according to an electromagnetic radiation intensity of the television.

17. The non-transitory medium of claim 13, wherein the sensor is turned on when a remote control receiver of the television receives a detection signal from a remote control transmitter.

18. The non-transitory medium of claim 13, wherein the sensor is an infrared senor, a facial recognition sensor, or a microwave sensor.

* * * * *